Sept. 7, 1965 E. A. QUADE 3,205,302

FACSIMILE TRANSMISSION SYSTEM

Filed Nov. 2, 1962

INVENTOR.
EDWARD A. QUADE

BY John L Jackson

ATTORNEY 3,205,302
FACSIMILE TRANSMISSION SYSTEM

Edward A. Quade, San Jose, Calif., assignor to International Business Machines Corporation, New York, N.Y., a corporation of New York Filed Nov. 2, 1962, Ser. No. 235,091
4 Claims. (Cl. 178—6.6)

This invention relates to facsimile transmission systems in general and more particularly to a facsimile transmission system wherein two arrays of photocells are ANDED together to provide an analog signal indicative of the print content of a document or other subject moved past one of the arrays.

Facsimile transmission systems which have been developed for facsimile transmission in connection with news reporting activities are relatively expensive, quite slow and suffer from poor resolution. Typical of these systems is the light spot-photocell arrangement which provides an analog signal indicative of the print content of the document to be transmitted. Due to the fairly limited number of facsimile transmission systems and the financial capabilities of the users, the relatively high expense of these facsimile systems has been no impediment to the wide-spread use which has evolved. Additionally, since traditionally the facsimile systems in the news media applications are used primarily to transmit only photographs and other like information, the relatively low transmission rate of the system can be tolerated. Finally, while the resolution of the system is fairly poor, it is of suitable resolution for the purpose intended, i.e., casual perusal by news media readers.

Recent developments in information storage and retrieval have pointed out the need for a facsimile transmission system which can transmit visual data in the form of an analog signal from a central image storage file to a remote location where the analog signal is reconverted to visual form. To make the system economically feasible in an information storage and retrieval application, it must be relatively inexpensive. Additionally, since the user of the information storage and retrieval system will be a more refined user in the sense that technical reports, graphs, photographs, etc., for use by scientists will often be transmitted, the system resolution must be quite good. Likewise, it is extremely important that the transmission rate of the system be quite fast so that the number of inquiries that can be handled per remote location is high.

It is, therefore, an object of the present invention to provide a novel facsimile transmission system which, while having extremely good resolution, is relatively inexpensive.

Another object of the present invention is to provide a facsimile transmission system which has extremely good resolution.

Another object of the present invention is to provide a novel method of converting the print content of a document to be transmitted to an analog signal through use of two arrays of photocells which are ANDED together.

Another object of the present invention is to provide a circuit for use with the ANDED arrays of photocells which provides an information bearing signal which can be transmitted to a remote location without need for complicated and expensive pulse shaping circuitry.

Other and further objects and advantages of the invention will be apparent from the following more particular description of the preferred embodiment of the invention as illustrated in the accompanying drawings in which.

Briefly, a facsimile system is provided which, for scanning a document to be transmitted, employs two arrays of photocells which are ANDED together. The first array of photocells is rectangular in configuration and is disposed on the face of a cathode ray tube. Each of the photocells of the first array is ANDED with an associated photocell of a second array which are disposed in a line transverse to the movement of the document to be scanned. The beam of the cathode ray tube is used to strobe or scan the first array to provide a varying analog output across a common load resistor which output will vary in accordance with the image of the document being projected on the second array. The signal is then transmitted to a remote location and used to control the beam of a second cathode ray tube such that a rectangular array of photocells disposed on its face are selectively energized. Printer inputs are taken from each of the cells on the face of the second cathode ray tube.

Figure 1:
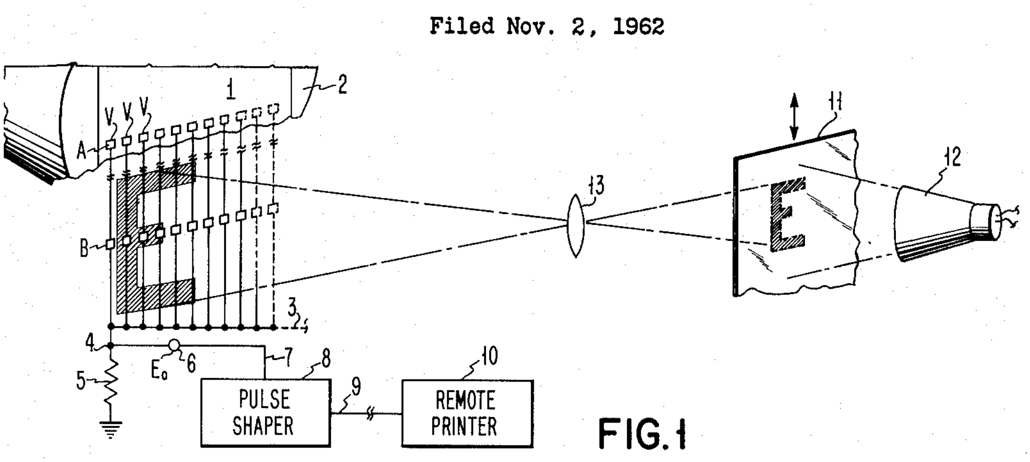
FIG. 1 is a schematic illustrating a method of and device for scanning a document to be transmitted.

Refer first to FIG. 1 wherein is shown a first array of photocells A disposed on the face 1 of a cathode ray tube 2. The photocells of array A have a potential applied to them and will be arranged in, for instance, a rectangular pattern such that the spot of the cathode ray tube 2 during its sweep, will sequentially impinge on the photocells going from left to right and top to bottom. Each of the photocells of array A is connected to an associated photocell in array B. The photocells in array B are arranged in a line which is of sufficient length to accommodate any document or other subject to be scanned by the facsimile system. It has been found that good resolution can be obtained when approximately 100 photocells per inch in array B are used.

The photocells of array B are in turn connected by a common line 3 to a summing point 4. The summing point 4 is connected through a common load resistor 5 to ground and to the output terminal 6. The output of the camera is fed along line 7 to a pulse shaper 8 which in turn is connected by means of transmission line 9 to a remote printer 10.

The document to be scanned 11 is shown illuminated by a light source 12 and imaged by means of a lens 13 onto array B. Document 11 is arranged for movement past lens 13 and array B so that the image of the print content on the document is caused to move past array B. In operation, assume that a portion of the document 11 as shown falls on array B. As the beam of the cathode ray tube 2 moves across the photocells of array A, each photocell becomes conductive, and, assuming that the illumination falling on its associated photocell in array B is relatively bright, i.e., not blocked by the print content of the document 11, a signal will be fed to the pulse shaper 8 to be transmitted to the remote printer 10. When the associated photocell in array B is dark, no signal will be transmitted at that instant from the pulse shaper 8 to the remote printer 10. In this manner, the beam of the cathode ray tube 2 is used to strobe the photocells of array A which are in turn ANDED with the photocells of array B to provide a serial signal indicative of the print content of the portion of the document to be transmitted which at that instant falls on the photocells of array B. Any number of types of remote printers 10 are available which are capable of utilizing this signal to reconstruct the facsimile of the original document 11 at a remote location.

Figure 2:
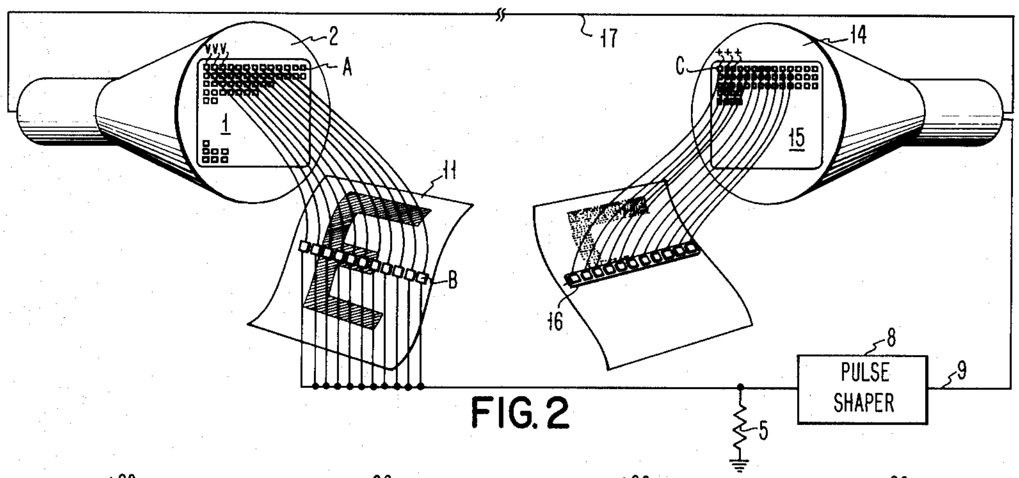
FIG. 2 is a pictorial representation of the overall system.

In FIG. 2 is shown a facsimile system where, as in FIG. 1, a first array of photocells in rectangular configuration are disposed on the face 1 of a cathode ray tube 2. Again, each of the photocells of array A is connected to an associated photocell in array B which are disposed in a line transverse to the movement of document 11 to be transmitted. The photocells of array B are connected across a common load resistor 5 which in turn is again connected to a pulse shaper 8. The output of the pulse shaper 8 is fed along line 9 to a second printer cathode ray tube 14 having an array C of photocells deposited on its face 15 in a recatngular confiuration. Each of the photocells of the C array are connected to a positive potential and to the input of a wire printer 16. The output wires of the wire printer 16 are disposed transverse to the movement of a paper or other print media onto which the facsimile is to be printed on. The print wires of the wire printer 16 are disposed in like configuration to the B array of photocells in the camera.

The scanning beam of the cathode ray tubes 2 and 14 are tied together in synchronization by a line 17.

In operation, the serial signal indicative of the print content of document 11 developed across load resistor 5 is shaped by pulse shaper 8 and transmitted along line 9 to the V axis control of cathode ray tube 14. The signal is used to control the beam such that only those cells which correspond to a region of light in array B will receive light from the beam of cathode ray tube 14. In all other cases the beam will be suppressed. When the photocells of array C are exposed to light, they conduct the high voltage to the print wires and effect printing. Although the beam persists for only approximately 2 microseconds, the long decay time of the photocells allows the print wires to operate until a new cycle recharges the cell if it is to continue printing a portion of the character.

The photocells have a fairly rapid rise time, less than 10 microseconds and have a decay time of about 2 milliseconds. Thus, with the image of the document to be transmitted passing over the B array at rates of about one 8½ x 11 page in 5 seconds, the photocells can adjust their resistance to be a function of the light falling upon them with good fidelity. While this rather slow process is going on, the cathode ray beam sweeps over the cells in array A dwelling on each one for about 2 microseconds and taking about 2 milliseconds to complete the cycle of sweeping all cells assuming a 1,000 cell array. These cells cannot return to 0 in the short time of exposure; they can, however, return in the total time of 2 milliseconds. Operating in this manner, the resistor 5 has impressed upon it a wave form with a small period of very fast rising voltage for each 2 microsecond periods in which both cells in arrays A and B are conducting. This then transcribes the paralleled information from the row of B cells to a serial form.

Figure 3:
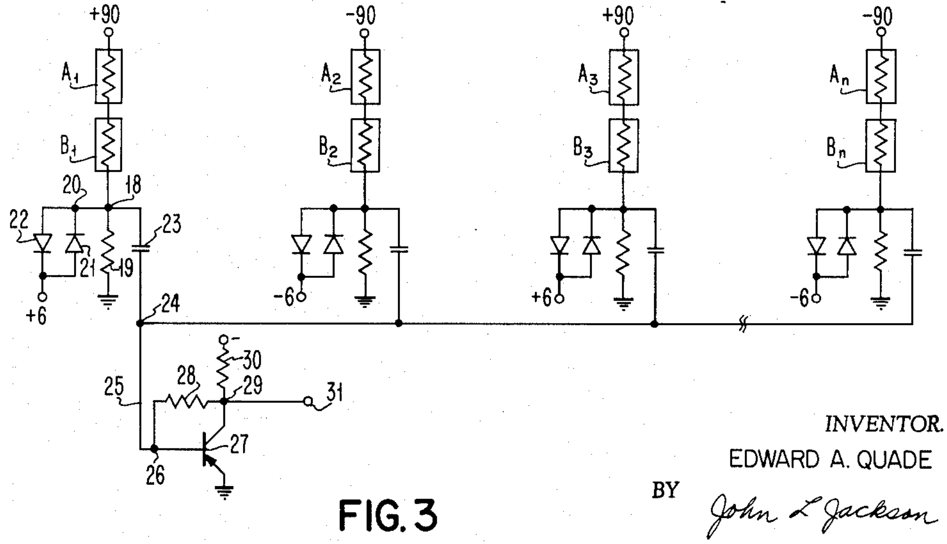
FIG. 3 is a schematic of a circuit for use in conjunction with the scanning portion of the system.

Utilization of the circuit of FIG. 3 substantially increases the scan rate of the facsimile system and provides an output signal which can be transmitted directly to the remote cathode ray tube printer without need for complicated pulse shaping circuitry.

In FIG. 3 are shown the two arrays of photocells with each photocell in array A being connected to an associated photocell in array B. A positive potential is connected to photocell $A_1$, a negative potential is connected to photocell $A_2$, a positive potential is connected to photocell $A_3$, etc. Thus, the photocells are connected to alternative supply voltages. Each of the photocells in array B is connected, as for instance in the case of photocell $B_1$, to a junction 18 which in turn is connected to one side of resistor 19, the other side of which is connected to ground and to junction 20. Junction 20 is connected to the cathode of diode 21 and the anode of diode 22. The cathode of diode 22 and anode of diode 21 are connected to a potential of the same polarity as that connected to the A photocell with which it is associated.

Junction 18 is also connected through differentiating capacitor 23 to junction 24. Junction 24 is connected along line 25 to junction 26. Junction 26 is connected to the base of PNP transistor 27 the emitter of which is grounded. Junction 26 is also connected through bias resistor 28 to junction 29. Junction 29 is connected through collector load resistor 30 to a negative potential and to the output terminal 31.

From a consideration of the alternate connection of the supply voltages to the A photocells, it can be seen that the speed of operation of the scanning system is no longer a function of the decay time of the A photocells, i.e., 2 milliseconds, but is a function of the rise time of the A photocells which is in the order of 10 microseconds. Thus, the alternate supply voltages provide a push-pull signal at terminal 24 in the event that adjacent photocell pairs are conducting. Thus, rather than allowing the signal at junction 24 to decay gradually in accordance with the decay characteristics of the photocells, the signal at junction 24 is rapidly reversed by the conduction in the adjacent photocell pairs.

The back-to-back diodes 21 and 22 at the output of each photocell gate clamp the voltage swing at junction 18 and, consequently, at junction 24 between prescribed levels. Thus, considering the back-to-back diodes associated with photocells $A_1$ and $B_1$ junction 18 will be at approximately +5.4 v. when photocell $A_1$ is not conducting and will be at approximately 6.6 v. when photocells $A_1$ and $B_1$ are conducting.

Resistors 28 and 30 and transistor 27 comprises a common transistor amplifier for amplifying the A.C. signal appearing at junction 24. Capacitor 23 functions to remove the D.C. level and to differentiate the signal.

In the above described manner, I have provided a novel method and device for scanning document to be transmitted via a facsimile system in which two arrays of photocells are utilized and ANDED together to provide a serial signal indicative of the print content of the subject. Additionally, I have provided a novel system for utilizing the scanning method and device wherein the serial signal indicative of the print content of the document is utilized to control the V axis of a remote cathode ray tube printer for reproducing the original subject. Moreover, there has been provided a novel method of utilizing the signal obtained from the two arrays of ANDED photoconductors such that the time response of the scanning portion of the system is independent of the decay characteristics of the photoconductors utilized. Instead, the time response of the scanning portion of the system, through utilization of the novel circuit, is a function of the rise time of the photoconductors which is relatively rapid. Thus, not only through utilization of the novel circuit is the response time of the scanning portion of the system greatly improved, but the signal obtained is push-pull which can be readily transmitted to a remote printer without need for complicated pulse shaping circuitry.

While the invention has ben particularly shown and described with reference to a prefrred embodiment thereof, it will be understood by those skilled in the art that various changes in the form and details may be made therein without departing from the spirit and scope of the invention.

What is claimed is:

1. A facsimile camera for providing a serial signal indicative of the print content of a subject to be transmitted to a remote printer comprising:

a first array of photoconductors disposed on the face of a cathode ray tube in optical association with the light spot thereof, alternate polarity potentials connected to adjacent photoconductors in said first array, a second array of photoconductors, each of said photoconductors of said second array being electrically connected to an associated photoconductor of said first array, means for imaging said subject onto said photoconductors of said second array, and output means serially connecting all of said photoconductors of said second array.

2. A facsimile camera for providing a serial signal indicative of the print content of a subject to be transmitted to a remote printer comprising:

a first array of photoconductors disposed on the face of a cathode ray tube in optical association with the light spot thereof,
alternate polarity potentials connected to adjacent photoconductors in said first array,
a second array of photoconductors disposed in a line,
each of said photoconductors of said second array being electrically connected to an associated photoconductor of said first array,
means for imaging said subject onto said second array of photoconductors and moving said image with respect thereto, and
output means serially connecting all of said photoconductors of said second array.

3. A facsimile system comprising:
a facsimile camera including a first array of photoconductors disposed on the face of a cathode ray tube in optical association with the light spot thereof,
alternate polarity potentials connected to adjacent photoconductors in said first array,
a second array of photoconductors,
each of said photoconductors of said second array being electrically connected to an associated photoconductor of said first array,
means for imaging a subject onto said photoconductors of said second array,
pulse shaping means connected to all of said photocells in said second array,
a second cathode ray tube,
means for synchronizing the sweep of said first and second cathode ray tubes,
a third array of photoconductors disposed on the face of said second cathode ray tube in optical association with the light spot thereof,
printing means connected to each of said photoconductors of said third array, and
means connecting said pulse shaping means to the V axis control of said second cathode ray tube.

4. A facsimile system comprising:
a facsimile camera including a first array of photoconductors disposed on the face of a cathode ray tube in optical association with the light spot thereof,
alternate polarity potentials connected to adjacent photoconductors in said first array,
a second array of photoconductors disposed in a line,
each of said photoconductors of said second array being electrically connected to an associated photoconductor of said first array,
means for imaging said subject onto said second array of photoconductors and moving said image with respect thereto,
pulse shaping means connected to all of said photocells in said second array,
a second cathode ray tube,
means for synchronizing the sweep of said first and second cathode ray tubes,
a third array of photoconductors disposed on the face of said second cathode ray tube in optical association with the light spot thereof,
printing means connected to each of said photoconductors of said third array, and
means connecting said pulse shaping means to the V axis control of said second cathode ray tube.

References Cited by the Examiner

UNITED STATES PATENTS

| | | |
|---|---|---|
| 2,624,786 | 1/53 | Potter. |
| 2,932,006 | 4/60 | Galuberman. |
| 2,959,349 | 11/60 | Marsh et al. |
| 3,005,106 | 10/61 | Wilkins. |
| 3,023,406 | 2/62 | Jones. |
| 3,043,962 | 7/62 | Jones. |

DAVID G. REDINBAUGH, *Primary Examiner.*